(12) United States Patent
Wette et al.

(10) Patent No.: US 8,747,239 B2
(45) Date of Patent: Jun. 10, 2014

(54) BOOT FOR JOINTS, SUCH AS CONSTANT VELOCITY JOINTS, WITH A TRANSITION AREA

(71) Applicant: GKN Driveline International GmbH, Lohmar (DE)

(72) Inventors: Joachim Wette, Hennef (DE); Markus Deisinger, Siegburg (DE)

(73) Assignee: GKN Driveline International GmbH, Lohmar (DE)

( * ) Notice: Subject to any disclaimer, the term of this patent is extended or adjusted under 35 U.S.C. 154(b) by 0 days.

(21) Appl. No.: 13/774,198

(22) Filed: Feb. 22, 2013

(65) Prior Publication Data

US 2013/0172089 A1    Jul. 4, 2013

Related U.S. Application Data

(63) Continuation of application No. PCT/EP2010/005170, filed on Aug. 24, 2010.

(51) Int. Cl.
*F16D 3/84* (2006.01)
(52) U.S. Cl.
USPC .......................................... 464/175; 464/904
(58) Field of Classification Search
USPC .............. 464/173, 175, 905, 906; 403/50, 51; 277/634–636; 74/18–18.2
See application file for complete search history.

(56) References Cited

U.S. PATENT DOCUMENTS

| 5,176,390 | A  | * | 1/1993 | Lallement ..................... 277/636 |
| 8,398,494 | B2 | * | 3/2013 | Takabe ...................... 464/906 X |
| 8,469,366 | B2 | * | 6/2013 | Deisinger et al. ............. 277/634 |
| 2007/0042827 | A1 | | 2/2007 | Deisinger |

FOREIGN PATENT DOCUMENTS

| EP | 0464984 A1 | 1/1992 |
| EP | 1975475 A2 | 10/2008 |
| EP | 2068026 A1 | 6/2009 |
| JP | 2010019291 A | * 1/2010 |
| WO | WO 2008058559 A1 | * 5/2008 |
| WO | WO 2008129913 A1 | * 10/2008 |
| WO | WO-2010028816 A1 | 3/2010 |

OTHER PUBLICATIONS

PCT International Search Report dated May 17, 2011 for PCT/EP2010/005170.

* cited by examiner

*Primary Examiner* — Gregory Binda
*Assistant Examiner* — Josh Skroupa
(74) *Attorney, Agent, or Firm* — Bejin, VanOphem & Bieneman PLC (57) ABSTRACT

A boot for joints, such as constant velocity joints, has a first attachment region and a fold region with a plurality of folds with peaks and roots and a transition area adjacent to the last fold arranged near said first attachment region. The transition area comprises a connecting root between said last fold in the transition part, wherein at least part of said transition part is inclined towards said first attachment region.

13 Claims, 7 Drawing Sheets

BOOT FOR JOINTS, SUCH AS CONSTANT VELOCITY JOINTS, WITH A TRANSITION AREA

CROSS-REFERENCE TO RELATED APPLICATIONS

This application is a Continuation Application claiming benefit of PCT/EP2010/005170, filed on Aug. 24,2010, which application is hereby incorporated by reference in its entirety.

TECHNICAL FIELD

The present disclosure provides for a boot for joints, such as for constant velocity joints, having a first attachment region and a fold region with a plurality of folds with peaks and roots, as well as a system comprising said boot and the use of such a boot and said system in constant velocity joints.

BACKGROUND

Space is certainly one of the most dominant characteristics and problems connected with the use and function of boots to be mounted especially on joints, including constant velocity joints. In an articulated or bended state of a joint, especially at angles above 30 degrees, most preferred above 35 degrees, in an inner area, where the folds of a boot are folded up, a convolute package is formed. Said convolute package is strain-induced, and, thus, tends to turn into an unwanted position. Further, pressure is induced in the fold region of the boot in the convolute package, especially in the roots and peaks thereof. Thus, there is a need for a boot wherein the convolute package is less strain-induced and less pressure is induced in the fold region when used in articulated joint states.

SUMMARY

A boot for joints, such as constant velocity joints, as defined in the beginning, is disclosed herein as comprising a transition area adjacent to a last fold arranged nearest said first attachment region, with the transition area comprising a connecting root between said last fold and said transition part. At least a part of the transition part is inclined towards the first attachment region. In fact, one may say, that the boot, in accordance with one exemplary arrangement, shows a half cut smallest fold arranged near said first attachment region. Advantageously, the boot provides for a convolute package in a form of a stack in an articulated state when mounted on joints, such as constant velocity joints, said stack being of homogeneous art when compared to convoluted packagings obtainable with boots known from the state of the art. Especially at angles above 30 degrees, further preferred above 35 degrees, much more preferred above 40 degrees, the convoluted package in form of a stack is orientated mainly in parallel with a main axis of a shaft, and most of flanks of folds of the fold region of the claimed boot are at least in part in contact with each other, that also holds for the transition part of the transition area. Thus, the convolute package is very small, and due to the orientation as a stack, the load lasting on the convolute packaging is advantageously distributed throughout the convolute package. Finally, the stress is decreased. The claimed boot, thus, shows a higher lifetime compared with boots known from the state of the art.

In one exemplary embodiment, the transition part of the transition area, in a cross-sectional view in a direction of a main axis of the boot, has a convex or an essentially planer shape. Whereas it is sufficient that only at least a part of the transition part, in one exemplary configuration more than 60 percent of the same referred to its length, will incline towards said first attachment region, in one exemplary configuration that over its whole length, the transition part is of essentially planar or convex shape. The transition part of the transition area is arranged directly adjacent to the connecting root. The connecting root is showing an outer curved wall that is at least in part slightly increasing in height with respect to the first attachment region. When the transition part has the exemplary convex shape, over the whole length of the transition part, the same is inclining towards the first attachment region. In one exemplary embodiment the transition part is thus mimicking at least in part the geometry of second flanks of folds directed to a second attachment region by which a boot may be mounted on a joint casing.

In one exemplary configuration, an angle $\phi$ defined between a line for an inner surface of the connecting root and an inside end of the first attachment region adjacent the transition area, and a line defined by an inner surface of the first attachment region, is in a range of about 0 degrees to about +60 degrees, preferably of about +10 degrees to about +40 degrees, most preferably in a range of about +15 degrees to about +35 degrees. If angle $\phi$ was 0 degrees, thus, the transition part of the transition area only in part is inclined towards the first attachment region. If angle $\phi$ was clearly above +60 degrees, it would not be possible to provide a boot having an optimized and decreased packaging volume of a convolute package in an articulated state.

In one exemplary embodiment, at least the connecting root, but probably also the further roots of the fold region of the boot claimed, is twisted with an angle $\alpha$, the angle $\alpha$ being defined between a line going through connecting root and the main axis of the claimed boot. Usual boots known from the state of the art show no twisting in an unmounted state with respect to the roots, that is angle $\alpha$ is 90 degrees. In contrast thereto, the twisting with an angle $\alpha$ in an unmounted state is advantageously used not only to decrease the space needed for the convolute packaging, if the boot would be articulated, but also to minimize stresses and pressure induced in the boot when articulated. Preferably, angle $\alpha$ referred to the connecting root, is in a range between about 10 degrees to about 50 degrees, preferably between about 15 degrees to about 40 degrees. In contrast thereto, angle $\alpha$ of the first root adjacent to said second attachment region is in a range of about 70 degrees to about 89 degrees, preferably in a range of about 75 degrees to about 88 degrees. In a further exemplary embodiment, angle $\alpha$ referring to the connecting root as well as the roots between the folds of the fold region increases from the first attachment region towards the second attachment region of the boot. Thus, angles $\alpha$ of roots between the connecting root and a first root neighboring the second attachment region are higher than angle $\alpha$, referred to the connecting root, and lower than angle $\alpha$ referred to the first root.

The embodiments set forth above, refer to a boot for joints such as for constant velocity joints, in an unarticulated state. However, under articulation of the boot in accordance with the present disclosure, further singular features are observable. Thus, the present disclosure also refers to a boot for joints, such as constant velocity joints, having a fold region with a plurality of folds, wherein under articulation at joint angles $\gamma$ above 35 degrees, on an inner area, where the folds are folded up, all folds are packed to a stack. In contrast thereto, under articulation, boots known from the state of the art, at joint angles $\gamma$ above 35 degrees did not show that all folds are packed to a stack, but instead bear at least one fold separated from the other folds forming a convolute packaging. In an exemplary embodiment of the present disclosure, also a transition area of a transition part is part of the stack. Preferably, within said stack flanks of all folds are essentially adjacent with each other, most preferably essentially parallel orientated with each other. The terms "orientated" or "adjacent" do not mean that the flanks of the folds are in direct contact with each other, and especially not in contact over their whole surfaces, but only that they are orientated with each other essentially adjacent, preferably essentially parallel. Of course, they may be in contact at least with a part of the surfaces of the flanks of the folds. The term "essentially" in that respect does not mean that each flank of each fold is orientated towards the neighboring flank of the neighbouring fold in a more or less co-linear manner, but also encompasses embodiments in which especially the flanks of a first fold neighbouring a second attachment region is twisted by an angle in a region about 50 degrees to about 80 degrees, referred to a line through the peak of the first fold, and, further, a line defined by an inner surface of a first attachment region. At least, the convolute packaging in form of a stack, thus, is a lop-sided stack.

In a further exemplary embodiment of the present disclosure, the boot claimed under articulation comprises a transition area adjacent to a last fold arranged nearest the first attachment region, the transition area comprising the transition part, wherein at least a part of an outer surface of the transition part is in contact with at least a part of an outer surface of a first flank of the last fold. Preferably, the outer surface of the transition part is in contact over its whole area with the outer surface of the first flank of the last fold. In one exemplary configuration, the transition part is at least partially essentially parallel with the first flank of the last fold.

In another exemplary embodiment, the claimed boot under articulation is characterized in that at least the first flank of the last fold and the transition part of the transition area are orientated in parallel to a main axis of a shaft on which the boot is arrangable. Further, also a second flank of the first fold as well as the first and second flanks of further folds of the fold region of the claimed boot are more or less essentially orientated in parallel to the main axis of the shaft. The higher the joint angle $\gamma$, the more orientated in parallel are the first and second flanks of the folds of the fold region of the boot in accordance with the disclosure. Again, it must be pointed out that the term "orientated in parallel" is to be understood as explained above with respect to the definition of the stack in that flanks of all folds in the stack are essentially adjacent, preferably essentially parallel, with each other. Thus, in that respect it is referred to the definition of the term "adjacent" or "parallel", as well as term "essentially" given above.

In an exemplary configuration of the present disclosure, the boot under articulation comprises an inner surface of the last root of the last fold neighboring the first attachment region and/or an inner surface of the connecting root are in contact with a joint casing to which the boot is arrangable. Preferably, at high joint angles $\gamma$, that is joint angles $\gamma$ around about 45 degrees and more, the inner surface of the connecting root as well as the inner surface of the last root of the last fold of the fold region are in contact with the joint casing to which the boot is arrangable. At other joint angles $\gamma$, for example joint angles $\gamma$ in a region between about 39 degrees to about 43 degrees, preferably the inner surface of the last root of the last fold is in contact with the joint casing, and, further preferred, also inner surfaces of at least one of the further roots of the further folds are in contact with the joint casing. The main contact surface between the stack of the convolute packaging in the boot under articulation is provided for by the inner surface of the transition part of the transition area, whereas further contact surfaces are only provided for by the inner surfaces of roots of the folds of the fold region, preferably of only one or only two inner surfaces of one or two roots of one or two folds of the fold region at joint angles $\gamma$ around 40 degrees or more. The contact through the contact surfaces of the boot is made with the outer surface of the shaft and/or especially the front edge of the joint casing.

The present disclosure further refers to a system comprising a boot in an unarticulated state or under articulation as described before, a shaft, and a joint casing, the boot being upset mounted on the shaft on the joint casing. By upset mounting, it is further possible to reduce the space needed for the boot in the claimed system. Preferably, the system is mounted upset in a range of around 10 percent to around 35 percent, referred to the length of an unmounted boot according to the present disclosure.

In an exemplary configuration of the present disclosure, the claimed system provides for an angle $\beta$, defined between the main axis of the shaft in an unarticulated condition of the system, and a peak line defined by a peak of the last fold nearest the first attachment region, angle $\beta$ being in a range of about 10 degrees to about 60 degrees, most preferably in a range of about 22 degrees to about 45 degrees. In one exemplary arrangement of the system claimed, angle $\beta$ of further folds following the last fold of the fold region towards the second attachment region is higher than angle $\beta$ of the last fold. Angle $\beta$ of the first fold adjacent the second attachment region is preferably in a range of about 65 degrees to about 92 degrees, most preferably in a range of about 70 degrees to about 88 degrees. Thus, angle $\beta$ referring to the folds between the last fold nearest the first attachment region and the first fold adjacent the second attachment region show angles $\beta$ increasing from the last fold to the first fold.

The present disclosure further refers to a use of a boot in an articulated or unarticulated state as described above in constant velocity joints, as well as to a use of a system as described above in constant velocity joints.

Other advantages and features of the disclosure will become apparent to one of skill in the art reading the following detailed description with reference to the drawings illustrating features of the disclosure by way of example.

BRIEF DESCRIPTION OF THE DRAWINGS

For more complete understanding of this disclosure, reference should now be made to the embodiments illustrated in greater detail in the accompanying drawings and described below by way of examples of the disclosure.

In the drawings.

DETAILED DESCRIPTION

Although the present disclosure is described with respect to a boot for joints, such as constant velocity joints, the present disclosure may be adapted and utilized for other fixable sealing applications, including such applications outside of a constant velocity joint. Especially, the boot in accordance with the present disclosure may be a convoluted boot. However, also any other machinery form parts may be protected by the boot in accordance with the present disclosure. The boot in accordance with the present disclosure usually shows two attachment regions. If the boot is designed to be fixed on a shaft and a joint casing, the first attachment region is assigned to the shaft, whereas the second attachment region is assigned to the joint casing in the sense of the present disclosure.

In the following detailed description, especially orienting terms are used such as "left", "right", "inner", "outer", "next to", "nearest", "following", "neighboring" and the like. It has to be understood that these terms are used for convenience of description of the components or embodiments by reference to the drawings. These terms do not necessarily describe the absolute location in space, such as upward, downward, left, right etc., that any part must assume. Further, in the following description, various operating and numerical parameters and components are described with several constructed embodiments. These specific parameters and components are included as examples and are not meant to be limiting, with the exception of parameters and components being claimed in the enclosed set of claims.

Further, it is to be expressively pointed out that the invention is not restricted to the feature combinations as shown in the figures. Instead, the features which are respectively disclosed in the description including the description of the figures can be combined with those features specified in the figures. In particular, it is to be noted that any reference signs which are incorporated in the patent claims are not intended in any way to restrict the scope of protection of the present invention, but rather merely refer to the exemplary embodiments shown in the figures. Furthermore, it is to be noted that the embodiments of a boot 10 in accordance with FIG. 1 to 9 merely constitute exemplary embodiments, in particular with regard to the number of annular folds provided there. More or fewer folds can be arranged in a fold region 18. Finally, identical reference signs are used for identical features when discussing the drawings.

In the context of the present disclosure, the term "angle φ" is to be understood as follows: With respect to a boot in accordance with the present disclosure, angle φ is defined between a line 58 (see FIG. 4) through an inner surface of a connecting root, and an inside end of a first attachment region adjacent a transition area, and a line 56 defined by an inner surface of the first attachment region. Thus, line 58 is a tangent with respect to connecting root as well as an inside end of the first attachment region. Line 56, in contrary, is defined by an inner surface of the first attachment region being co-linear to a main axis 26 of the boot. In contrast to the definition of angle φ with respect to a boot in accordance with the present disclosure, angle φ for a boot in accordance with the state of the art is defined in another way. The reason is a transition area 24 of the boot in accordance with the present disclosure may be seen as resembling the second (right) flank 29.1 of last fold 18.1 of a boot in accordance with the present disclosure (see FIG. 2). Thus, in a boot in accordance with the state of the art, whereas line 56 is defined in an identical way, when compared to angle φ defined for a boot in accordance with the present disclosure, line 58 is defined by inner surface 23.1 of last root 22.1 of last fold 18.1 as well as a last peak 20.1 of last fold 18.1. Thus, line 58 may be described as a tangent with respect to the last root 22.1, and with respect to peak 20.1 as going through a turning point defined by the last peak 20.1 of the last fold 18.1 From the definition of angle φ with respect to a boot in accordance with the present disclosure as well as a boot in accordance with the state of the art, it becomes quite clear that the sign of angle φ is changing. Thus, in the context of the present disclosure, angle φ is designated with "+" with respect to a boot in accordance with the present disclosure, whereas with respect to a boot in accordance with the state of the art, negative values are used.

In the context of the present disclosure, the term "joint angle γ" is to be understood as follows: In an articulated state of a system in accordance with the present disclosure, joint angle γ is defined by a main axis of 94.1 of the shaft 92 in an unarticulated situation, and a main axis 94.2 of the shaft in the articulated situation. This may also be taken from FIG. 7a or 8b of the present disclosure.

In the context of the present disclosure, the term "angle α" is to be understood as follows: Angle α is defined between a line 62 going through connecting root or any other root of the folds in the fold region, also through roots of folds in a fold region of a boot in accordance with the prior art, and said main axis 26 of the boot. The definition of angles α with respect to a boot in accordance with the state of the art as well as a boot in accordance with the present disclosure may also be derived from FIG. 2 to 4 of the present disclosure. Line 62 in each case is dividing either connecting root or any other roots in a symmetrical way. Whereas for roots in accordance with the state of the art, angle α is always 90 degrees in an unmounted state, in a mounted state also boots in accordance with the present disclosure may show an angle α between around 80 degrees to around 89 degrees for some of the roots in the fold region. In contrast thereto, angle α with respect to all roots including connecting root of a boot in accordance with the present disclosure already in the unmounted state show an angle α being less than 90 degrees.

In the context of the present disclosure, the term "angle β" is to be understood as follows: Angle β is defined between the main axis 94 of the shaft in an unarticulated condition of the claimed system in accordance with the present disclosure, and a peak line 64 defined by a peak of the last fold nearest the first attachment region. Thus, angle β in each case refers to a mounted boot, however, in an unarticulated condition. Line 64 goes through the peak of the last folds, thus, is going through a turning point of the last fold 18.1. Further, similar angles β are obtainable with respect to the further folds of the fold region of the boot in accordance with the present disclosure.

The boots are usually made of a thermoplastic elastomere material or mixtures of thermoelastic plastomere materials, for example based on polyurethane (TPU), polyamide (TPA), polyolefines (TPO), polyester (TPEE) or a thermoplastic elastomere vulcanizate (TPV), or a thermoplastic poly-ether-ester-elastomere (TEEE). The material or mixtures of materials of the boots in accordance with the present disclosure may be made of or may further comprise other materials, especially additives like diffusion-promoting add mixtures or any other additives a person skilled in the art will be aware of in view of the use of the boots in question, especially in view of the demands of automotive industry if the boots are used for automotives. However, the boots in accordance with the present disclosure may also be made of usual rubber-elastic materials, including mixtures thereof.

Advantages are provided by thermoplastic elastomer materials. These include materials known from the prior art that has two different polymer segments, namely a relatively rigid resin segment and an elastic soft segment. The individual polymer segments are comprised of longer chains of similar monomers. The resin segments hold the soft segments together by physical, network-like bonds. A thermoplastic elastomer material for manufacturing boots in accordance with the present disclosure is the thermoplastic material marked under the brand name "Hytrel" by the DuPont company.

In another aspect of the disclosure, the first and/or said second attachment region of the boot is at least partially manufactured of an elastomer material. In contrast to thermoplastic elastomer materials, an elastomer material has the advantage of having a reduced so-called "cold flow" then situated underneath the fastening element. This cold flow is understood to be the phenomenon in which, when subjected to clamping or compression stress, the plastic material in the first, but also in the second attachment region "escapes" literally from the fastener, as a result of which the boot can come loose during operation, particularly when under thermal stress. Other regions of the first and/or the second attachment region can nevertheless be manufactured of a thermoplastic elastomer material. The same advantage can also be achieved if a layer of the thermoplastic elastomer material is placed underneath the elastomer material. Possible elastomer materials include for example polyurethane rubber, polyester-based polyurethane/rubber mixtures or polycloroprenes.

The first attachment region of the boot is advantageously at least partially comprised of a layer of a thermoplastic elastomer material or a layer of an elastomer material. To a great extent, this avoids the known disadvantages of using thermoplastic elastomer materials in the clamping region of the collar. It is also possible for the layer, which is comprised of an elastomer material, to be integrally joined in a permanent fashion to the fastening mechanism.

As the method with which boots in accordance with the disclosure can be manufactured a pressblower injection blow moulding process is preferred, however, boots may also be produced with an injection/intrusion process, an injection moulding process, an injection/pressing process and/or an extrusion/blow moulding process. The pressblower injection blow moulding process and the injection/extrusion process are advantageously used, because precisely-dimensioned boots may be produced by said processes.

In the context of the present disclosure, the first and the second attachment region may be embodied in any possible way with respect to the needs of the system for which the boot shall be attached. For example, the first and/or second attachment region may comprise a binder seat region. In the binder seat region, a binder element may be located in order to fix the boot to any possible machinery parts, especially to a shaft and a joint casing. Such a binder element may be selected from each kind of fasteners known from the prior art, such as clamping elements, especially clamping straps, but also clamp or compression rings. Useful fasteners exhibit clamping and/or compression forces on the binder seats region of the boot. Further, the first and/or second attachment region may provide for slits located within the binder seats region directed towards a possible clamping element. Further, on the inner side surface of the first and/or second attachment region annular beads may be located, especially when slits are present in the binder seat region. The annular beads and the slits may especially be orientated to each other. The slits and/or annular beads may have different depths and/or heights. Further, the embodiment of the first and/or the second attachment region may be different from each other, but also may be identical. In a cross-sectional view, the annular beads located on the inner surface of the first and/or second attachment region, may have a triangular or a half-round shape. But also any other shape is possible. Further, the first and/or second attachment region may comprise orientating means in the form of a ring element or several block elements provided for only outside part of the first and/or second attachment region and at the ends of the boot opposing each other. The orientating means are useful for defining the binder seats region, and to hinder the binder element to sideslip from the first and/or second attachment region when the boot is mounted.

Referring now to the drawings, it must first of all be stated that all drawings used are true to scale, that is that all angles $\alpha$, $\beta$, $\gamma$ or $\phi$ are directly measurable from the drawings of the present disclosure.

Figure 1:
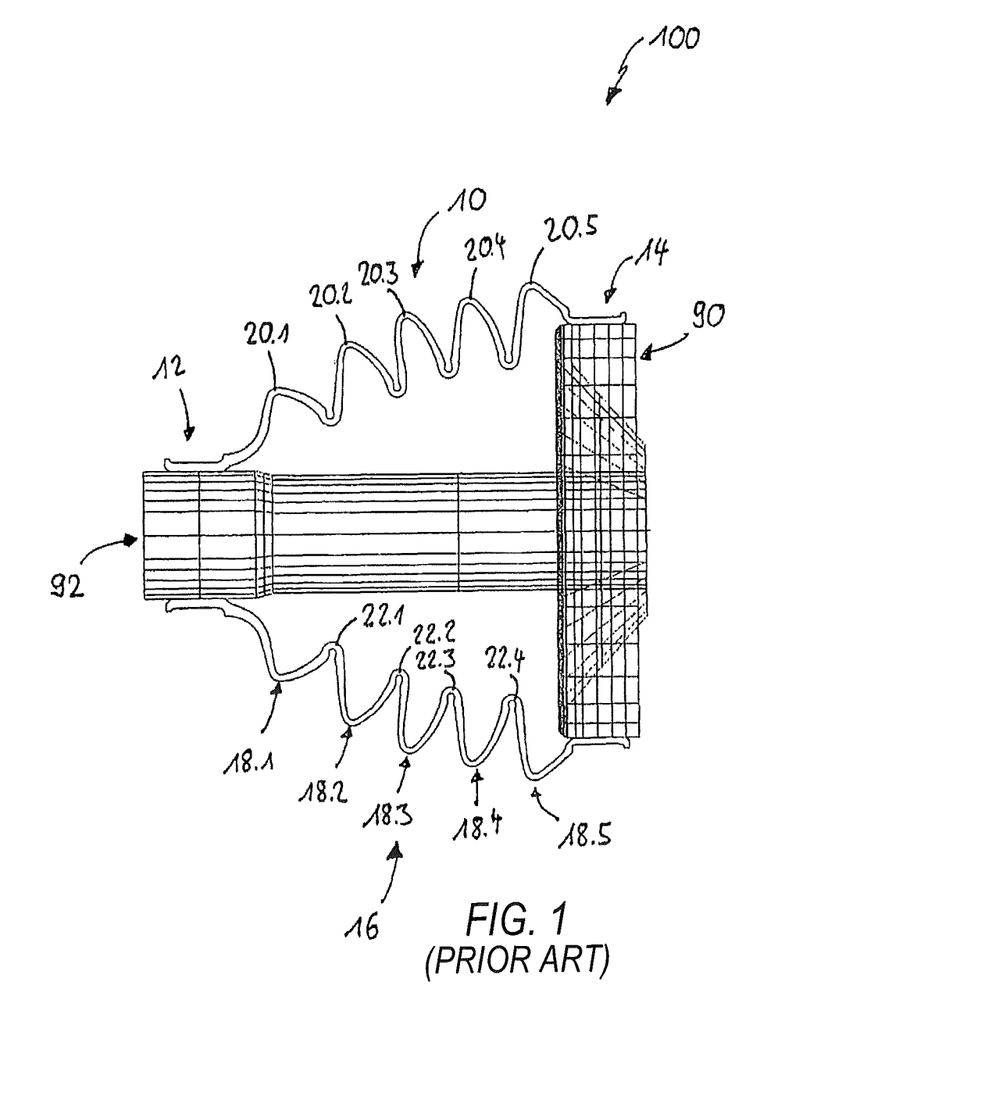
FIG. 1 is a side cut view of the system comprising a boot known from the state of the art.

FIG. 1 illustrates a system in accordance with the prior art with a boot 10 mounted on a shaft 92 and a joint casing 90 forming a system 100 by way of binder elements in a first attachment region 12 and a second attachment region 14, the binder elements being not shown. The boot 10 has a fold region 16 with five folds 18.1 to 18.5. Folds 18.1 to 18.5 show peaks 20.1 to 20.5 and roots 22.1 to 22.4 between peaks 20.1 to 20.5.

Figure 2:
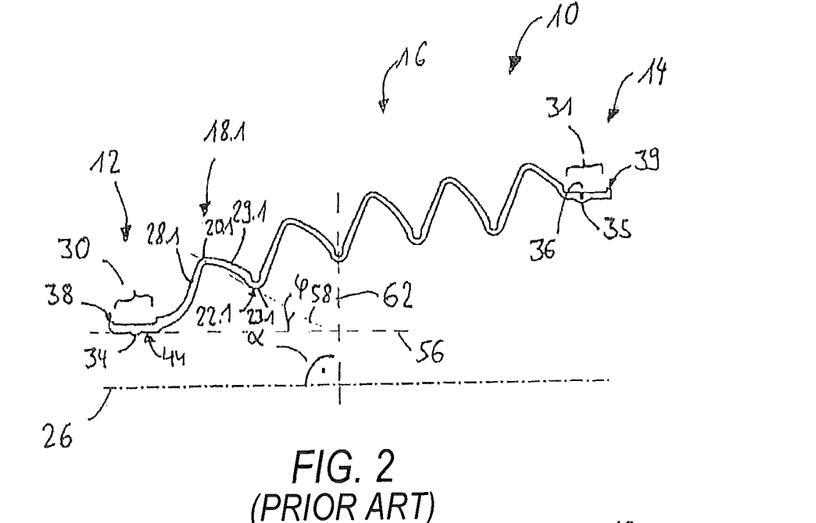
FIG. 2 shows a partial section through the upper part of a boot according to the state of the art in an unmounted state.

FIG. 2 shows a partial section of a further boot in accordance with the prior art, being similar to the boot 10 shown in FIG. 1, however, comprising a slit 36 in the second attachment region 14 and an annular bead 35 being orientated towards the slit 36. Second attachment region 14, thus, provides for a second binder seat region 31 for a binder element not shown, with one slit 36 and one corresponding annular bead 35. In contrast thereto, the first attachment region 12 provides for a first binder seat region 30 only providing for an inner surface 44 one centrally located annular bead 34. Boot 10 in accordance with FIG. 2 is shown in an unmounted and unarticulated state. A line 56 going through the inner surface 44 of said first attachment region 12 together with line 58 going through an inner surface 23.1 of last root 22.1 as well as peak 20.1 of last fold 18.1 of boot 10 defines an angle $\phi$ of $-28$ degree. Further, one may derive from FIG. 2 that angle $\alpha$ between a main axis 26 of boot 10 and line 62 going through a root between two peaks of neighbouring folds in the fold region 16 is 90 degree for all roots 22 of said boot 10.

Figure 3:
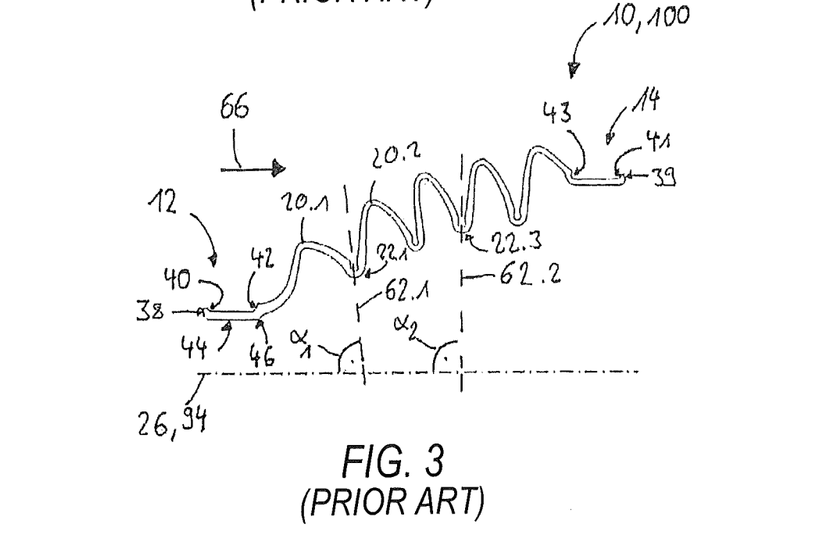
FIG. 3 shows a partial section of an upper part of a further boot according to the state of the art in a mounted state.

FIG. 3 again is a partial section of the upper half of a boot in accordance with the state of the art, however, now in a mounted, but unarticulated state. Boot 10 being part of a system 100 not shown in detail (see FIG. 1 in that respect) corresponds to boot 10 of FIG. 1. Especially, the first attachment region 12 and the second attachment region 14 are embodied differently compared to the boot in accordance with the state of the art in FIG. 2 of the present invention. First attachment region 12 provides for a side wall 40 of orientating means 38 and, further, a side wall 42 also providing an orientating means for a binder element not shown. The second attachment region 14, in turn, provides for a side wall 41 of orientating means 39 as well as a further side wall 43 of a second attachment region 14, thus also presenting an orientating means for a further binder element not shown. Boot 10 in accordance with FIG. 3 is mounted upset in view of the direction of arrow 66 on a shaft in the joint casing not shown in FIG. 3. By said upset mounting, some roots 22 between peaks 20 are slightly twisted with respect to a main axis 26 of the boot or main axis 94 of a shaft not shown in FIG. 3. As may be derived from FIG. 3, angle $\alpha_1$ referring to root 22.1 between peaks 20.1 and 20.2 defined by line 62.1 is about 85 degree, whereas angle $\alpha_2$ referring to the third root 22.3 and defined by line 62.2 is again 90 degree.

Figure 4:
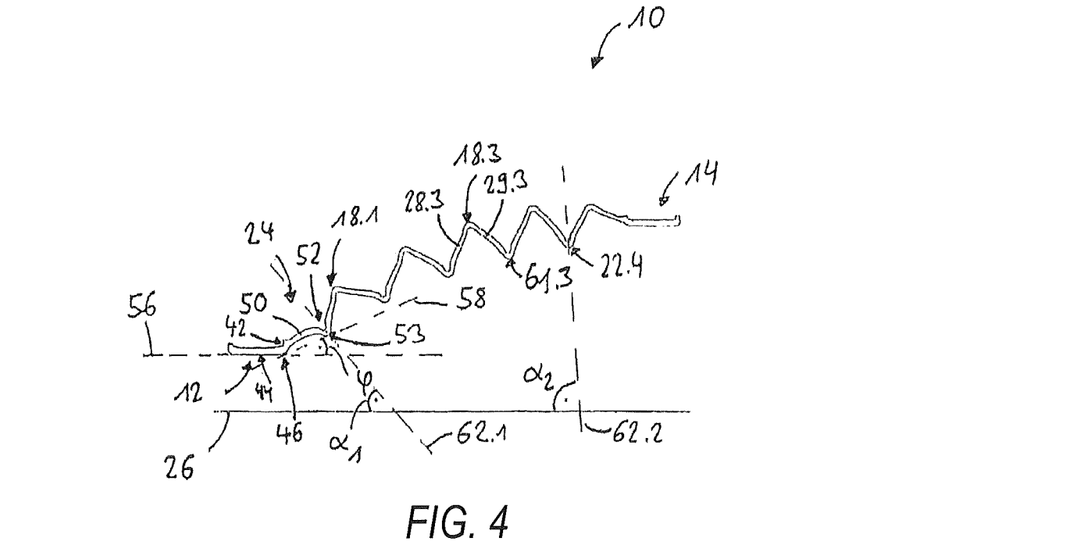
FIG. 4 shows a partial section of an upper part of a boot in accordance with an exemplary configuration of the present disclosure in an unmounted state.

FIG. 4 now shows a partial section of the upper part of the boot 10 in accordance with the present disclosure. A first attachment region 12 and a second attachment region 14 are embodied similar to the first and the second attachment regions 12, 14 of the boot in accordance with the state of the art according to FIG. 3. In contrast to the boot 10 in accordance with the state of the art in FIG. 3, boot 10 in accordance with the present disclosure shows a transition area 24 comprising a connecting root 52 between a transition part 50 and a last fold 18.1. Line 58 defined by an inner surface 53 of connecting root 52 and an inside end 46 of the first attachment region 12 as well as line 56 defined by an inner surface 44 of the first attachment region 12 forms an angle $\phi$ being around +24 degrees. Further, boot 10 of FIG. 4 being unmounted and unarticulated provides for an angle $\alpha_1$ between a main axis 26 of the boot 10 and a line 62.1 going through connecting root 52 of around 48 degrees. Further, an angle $\alpha_2$ between said main axis 26 and further line 62.2 going through root 22.4 is around 86 degrees. Angles $\alpha$, thus, are increasing from angle $\alpha_1$ to angle $\alpha_2$ in the boot 10 in accordance with the present disclosure.

Figure 5:
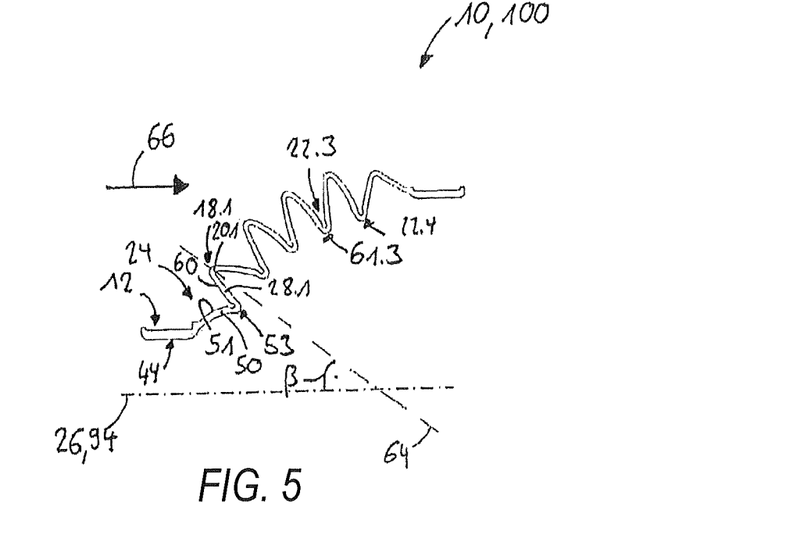
FIG. 5 shows a partial section of the upper part of the boot according to FIG. 4 in a mounted state.

FIG. 5 now shows a boot 10 of FIG. 4 in a mounted, but unarticulated state. The boot 10 is mounted upset in the direction of an arrow 66 on a shaft and a joint casing not shown here forming a system 100. Transition part 50 has, in a cross-sectional view, a convex-like shape and provides for an outer surface 51. Last fold 18.1 provides for a first flank 28.1 with an outer surface 60. Angle $\beta$ defined by said main axis 26 of boot 10 or main axis 94 of the shaft not shown, and a line 64 going through peak 20.1 of the last fold 18.1, is about 36 degrees. An angle $\beta$ not shown in FIG. 5, however being defined by a further line 64 going through root 22.3, is about 68 degrees.

Figure 6:
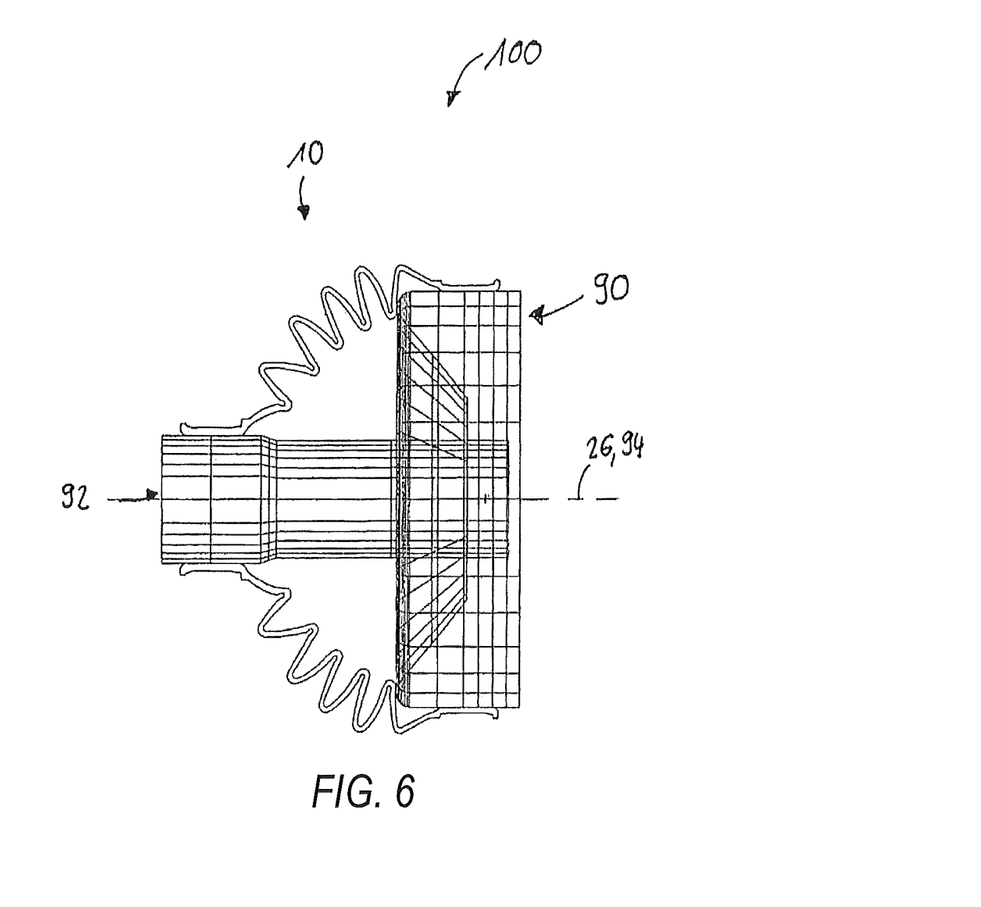
FIG. 6 is a cross-sectional view of a system according to the present disclosure with boot 10 in accordance with FIGS. 4 and 5.

FIG. 6 now shows a system 100 in accordance with the present disclosure, comprising root 10 in accordance with FIGS. 4 and 5 being upset mounted on a shaft 92 and a joint casing 94. Shaft 92 defines a main axis 94, and boot 10 defines main axis 26.

Figure 7A:
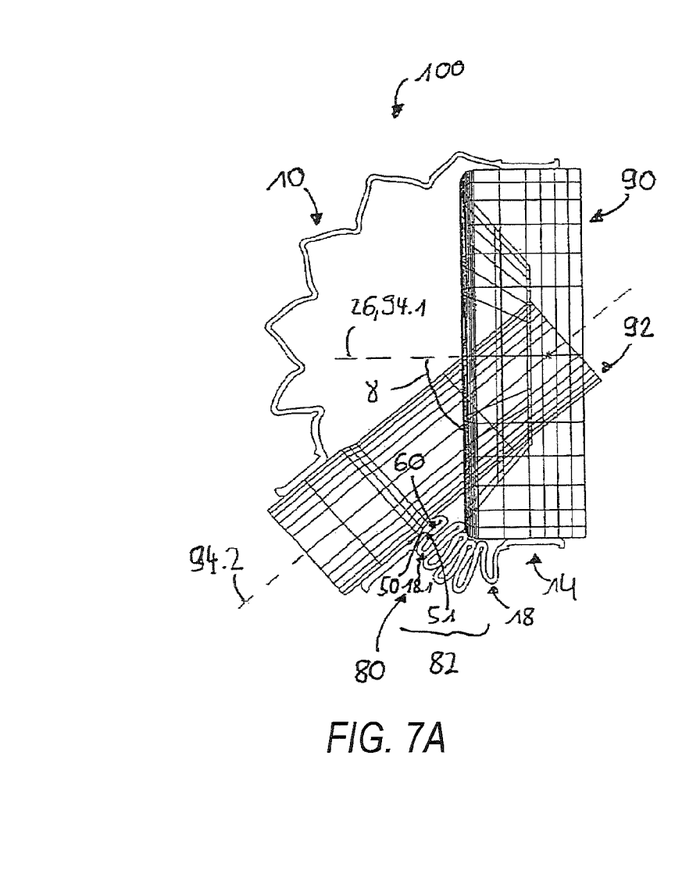
FIGS. 7a and 7b show a system in accordance with FIG. 6 and FIG. 1 in a bended state at a joint angle $\gamma$ of 40 degrees.

FIG. 7a now shows the system in accordance with FIG. 6 at a joint angle $\gamma$ of 40 degrees. On an inner area 80 a stack 82 is formed by the folds 18 of the fold region 16 of boot 10 as well as the transition area 24. Especially, transition part 50 with its outer surface 51 is in direct contact over the whole length with outer surface 60 of the first flank 28.1 of last fold 18.1. The inner surfaces of two of the roots of the boot 10 are in direct contact with the front edge of joint casing 92, whereas the last two roots neighboring the second attachment region 14 are not in direct contact with joint casing 90, but nearly in contact with the same. One may say that first flanks 28 and second flanks 29, as defined in FIGS. 2 and 4, are more or less orientated essentially adjacent, more precisely essentially parallel with each other. Further, folds 18 as well as transition part 50 are orientated more or less in parallel with bended main axis 94.2 of shaft 92.

Figure 7B:
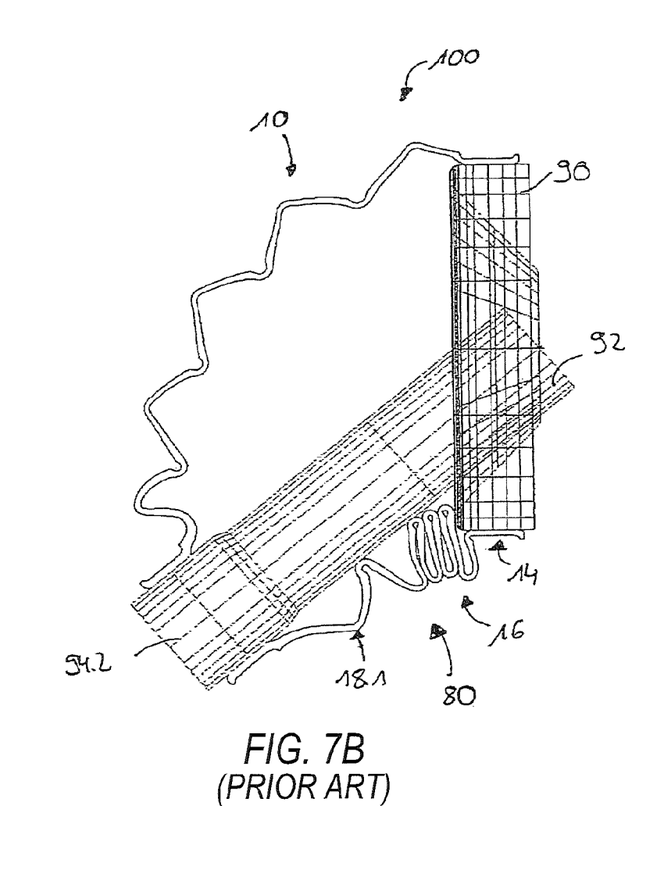

In contrast thereto, FIG. 7b shows the situation at a joint angle of 40 degrees in a system 100 with a boot 10 in accordance with the prior art as shown in FIG. 1. On an inner area 80 no stack is formed by all folds, especially last fold 18.1 is not part of a stack. Further, the folds are orientated essentially perpendicular to a main axis 94.2 of shaft 92. Further, not the roots of the folds in fold region 16 are in contact with the joint casing 90, but instead joint casing 90 is contacted with the part of an inner surface of a flank of the first fold adjacent the second attachment region 14.

Figure 8A:
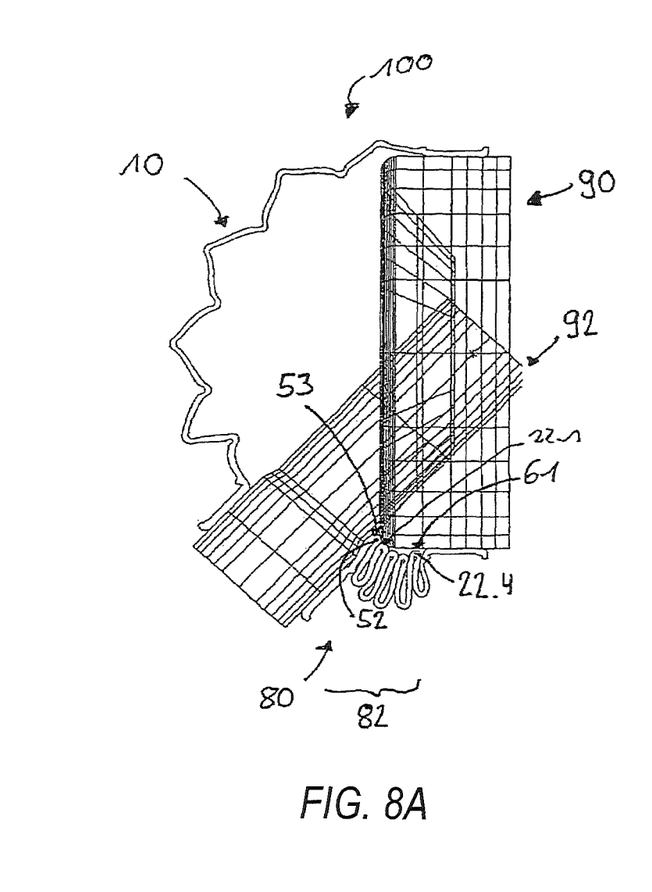
FIGS. 8a and 8b show a system in accordance with FIG. 6 and FIG. 1 in a bended state at a joint angle γ of 47 degrees.
Figure 8B:
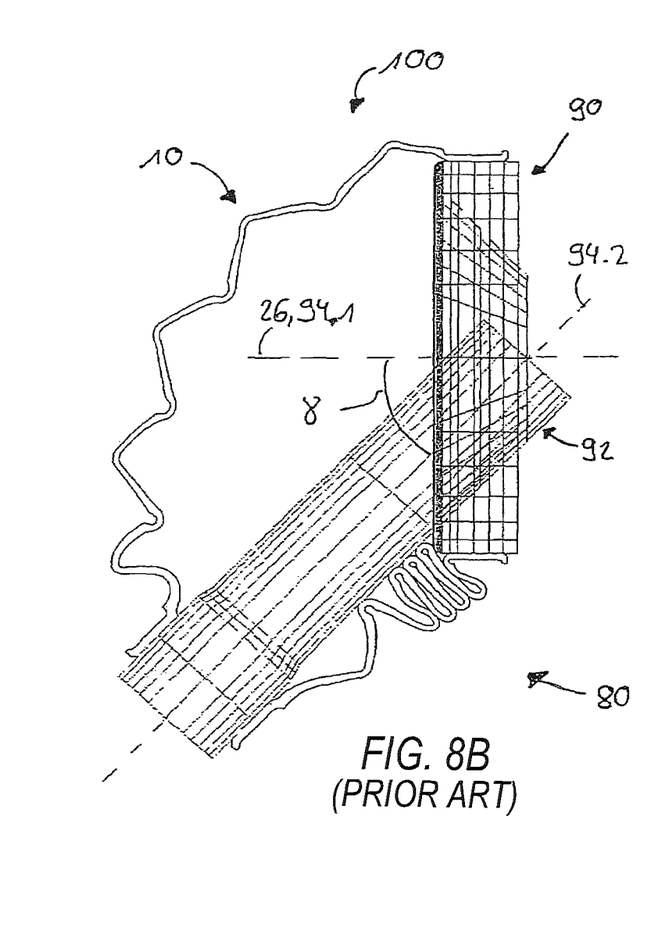

FIGS. 8a and 8b are similar to FIGS. 7a and 7b, however, the joint angle $\gamma$ is now 47 degrees. One may see that with respect to a system 100 in accordance with the present disclosure as shown in FIG. 8a, now all folds are packed to a stack 82 on said inner area 80, and that all flanks of the roots are at least in part in contact with each other. Further, also inner surface 53 of connecting root 52 is in contact with the front edge of joint casing 90. The same also holds with respect to root 22.1 of last fold 18.1. The further roots, especially root 22.4, is not in contact with its inner surface with said joint casing 90. In contrast thereto, FIG. 8b shows the situation in the system 100 with boot 10 in accordance with the state of the art, being more or less similar to the situation shown in FIG. 7b.

Figure 9:
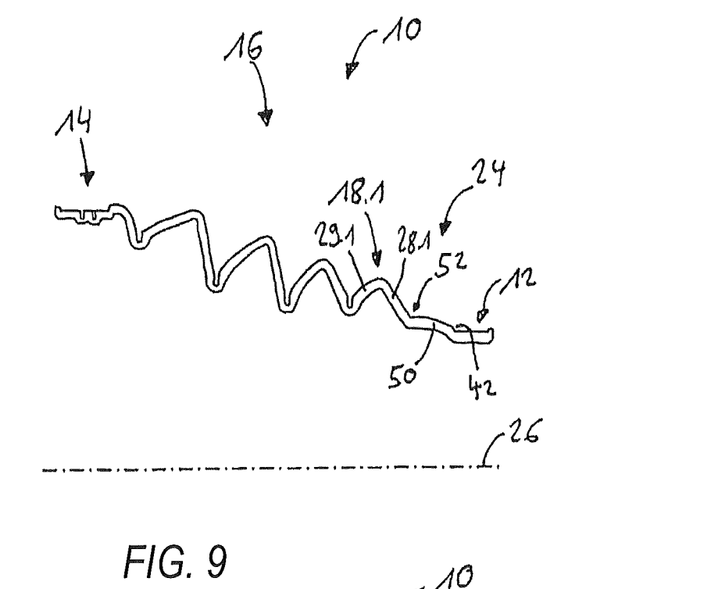
FIG. 9 shows a partial section of the upper part of a further embodiment of the boot in accordance with the present disclosure.

FIG. 9 provides for a further embodiment of a boot in accordance with the present disclosure. FIG. 9 is a partial section through an upper part of an unmounted and unarticulated boot 10 with a first attachment region 12 and a second attachment region 14 bearing two slits and correspondingly arranged annular beads on an inner surface of the second attachment region 14. A transition area 24 of the boot 10 is similar to transition area 24 as shown in FIG. 4, however, transition part 50 now has a planer shape and no convex shape. Transition part 50 inclines from a connecting root 52 to the first attachment region 12 between connecting root 52 and a side wall 42 of the first attachment region 12.

Figure 10:
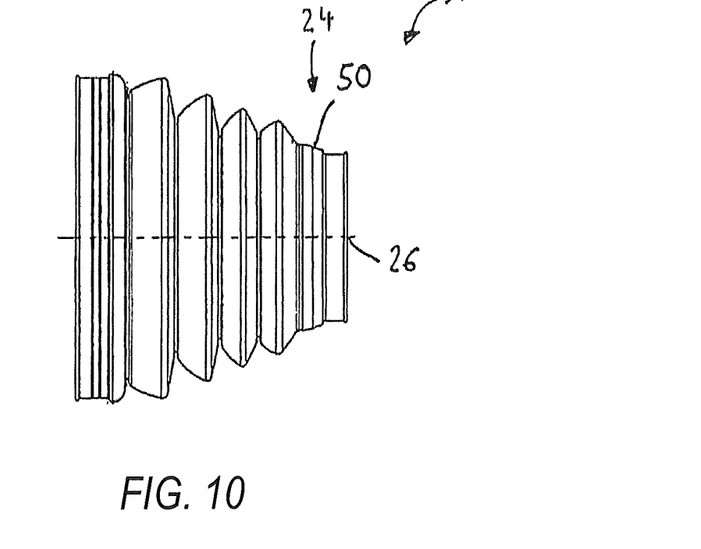
FIG. 10 is a side view of the boot in accordance with FIG. 9.

FIG. 10 is a side view of boot 10 in accordance with FIG. 9, whereas especially inclining transition part 50 of transition area 24 can be derived from.

The present disclosure consequently provides for a boot and a system that through the provision of a transition area near the first attachment region of a boot, especially for the attachment on a shaft, permits a minimization of space provided for especially on the inner area of a boot mounted on constant velocity joints in an articulated state at high joint angles $\gamma$.

While the inventive boot has been described in connection with one or more embodiments, the disclosure is not meant to be limiting. Rather, the invention covers all alternatives, modifications, and equivalents within the spiritual scope of the appended claims taking into account the description.

The invention claimed is:

1. A boot for joints such as constant velocity joints, comprising
   a fold region with a plurality of folds; and
   a transition area adjacent to a last fold arranged nearest a first attachment region, said transition area comprising a transition part;
   wherein under articulation at joint angles($\gamma$) above 35 degrees, on an inner area, where the folds are folded up, all folds are packed to a stack; and
   wherein at least a first flank of said last fold and said transition part are essentially oriented in parallel to a main axis of a shaft on which said boot is arranged.

2. The boot according to claim 1, wherein the folds further include flanks and wherein the flanks of all folds in the stack are essentially adjacent with each other.

3. The boot according to claim 1, wherein at least a part of an outer surface of said transition part is in contact with at least a part of an outer surface of said first flank of said last fold.

4. The boot according to claim 3, wherein said transition area is part of said stack.

5. The boot according to claim 1, wherein an inner surface of a last root of a last fold and/or an inner surface of a connecting root are in contact with a joint casing to which said boot is arrangeable.

6. A system, comprising:
   a boot according to claim 1,
   a shaft, and
   a joint casing,
   said boot being mounted upset on the shaft and the joint casing.

7. The system according to claim 6, wherein an angle($\beta$), defined between a main axis of said shaft in an unarticulated condition of said system, and a peak line defined by a peak of said last fold nearest the first attachment region, is in a range of about 10 degrees to about 60 degrees.

8. The system according to claim 7, wherein the angle($\beta$) for additional folds also is defined between a main axis of said shaft in an unarticulated condition of said system and a peak line defined by a peak of the additional folds of the fold region, wherein the angle($\beta$) for a successive fold is higher than the angle($\beta$) of said last fold.

9. The boot according to claim 1, wherein a transition part is at least partially essentially parallel to said first flank of said last fold.

10. A system, comprising:
    a boot according to claim 1,
    a shaft, and
    a joint casing.

11. The system according to claim 10, wherein said boot is mounted upset on the shaft and the joint casing.

12. The system according to claim 10, wherein an angle($\beta$), defined between a main axis of said shaft in an unarticulated condition of said system, and a peak line defined by a peak of said last fold nearest the first attachment region, is in a range of about 10 degrees to about 60 degrees.

13. The system according to claim 10, wherein the angle($\beta$) for additional folds also is defined between a main axis of said shaft in an unarticulated condition of said system and a peak line defined by a peak of the additional folds of the fold region, wherein the angle ($\beta$) for a successive fold is higher than the angle($\beta$) of said last fold.

\* \* \* \* \*